US011619305B2

(12) United States Patent
Olegnowicz

(10) Patent No.: US 11,619,305 B2
(45) Date of Patent: Apr. 4, 2023

(54) FLUID SEAL HAVING MULTIPLE DIAMETERS

(71) Applicant: Israel Olegnowicz, London (GB)

(72) Inventor: Israel Olegnowicz, London (GB)

( * ) Notice: Subject to any disclaimer, the term of this patent is extended or adjusted under 35 U.S.C. 154(b) by 337 days.

(21) Appl. No.: 16/571,157

(22) Filed: Sep. 15, 2019

(65) Prior Publication Data

US 2020/0088300 A1 Mar. 19, 2020

Related U.S. Application Data

(60) Provisional application No. 62/731,199, filed on Sep. 14, 2018.

(51) Int. Cl.
*F16J 15/3236* (2016.01)
(52) U.S. Cl.
CPC ................. *F16J 15/3236* (2013.01)
(58) Field of Classification Search
CPC ............... F16J 15/3236; F16J 15/32
See application file for complete search history.

(56) References Cited

U.S. PATENT DOCUMENTS

| | | | | |
|---|---|---|---|---|
| 3,396,874 A * | 8/1968 | Malone | ................. | B65D 83/48 222/402.1 |
| 3,451,727 A | 6/1969 | Deli et al. | | |
| 3,642,248 A * | 2/1972 | Benware | ................. | F16K 3/12 251/172 |
| 3,986,699 A * | 10/1976 | Wucik, Jr. | ............ | F16K 1/2285 251/173 |
| 4,300,859 A | 11/1981 | Donan | | |
| 4,306,706 A * | 12/1981 | Olansen | ................ | F16K 1/2263 251/306 |
| 4,445,598 A * | 5/1984 | Brambilla | ............... | F16F 9/364 188/315 |
| 4,861,315 A * | 8/1989 | Mazziotti | .............. | F16C 21/005 464/131 |
| 5,499,751 A * | 3/1996 | Meyer | .................... | A61F 9/0008 222/386 |
| 5,622,484 A | 4/1997 | Taylor-McCune et al. | | |
| 5,964,416 A * | 10/1999 | Jaeger | ............... | A61M 15/0081 239/333 |
| 6,978,916 B2 * | 12/2005 | Smith | .................. | B65D 83/425 141/20 |
| 9,757,750 B2 | 9/2017 | Holakovsky et al. | | |
| 2006/0022412 A1 * | 2/2006 | Brock | .................... | F16C 11/045 277/358 |
| 2008/0245988 A1 | 10/2008 | Maes et al. | | |
| 2016/0131264 A1 | 5/2016 | Bregazzi et al. | | |
| 2019/0032784 A1 * | 1/2019 | Jinbo | .................... | F16J 15/3204 |

FOREIGN PATENT DOCUMENTS

JP 2019002563 A * 1/2019 ........... F16J 15/3236

* cited by examiner

*Primary Examiner* — Eugene G Byrd
(74) *Attorney, Agent, or Firm* — Kimberly O Snead

(57) ABSTRACT

A seal to prevent fluid transfer using double diameters to provide a tighter seal is disclosed. The double diameter seal has a body with a first diameter containing an upper contact area and a second diameter forming a lower contact point. A notch extends into the body between the upper contact area and the lower contact point for a predetermined distance to form a transition point. In use, the first diameter is dimensioned to place a portion of the length of the upper contact area in sliding engagement adjacent to a length of the first surface. The second diameter dimensioned to place the lower contact point contacting an angled second surface of a valve.

17 Claims, 6 Drawing Sheets

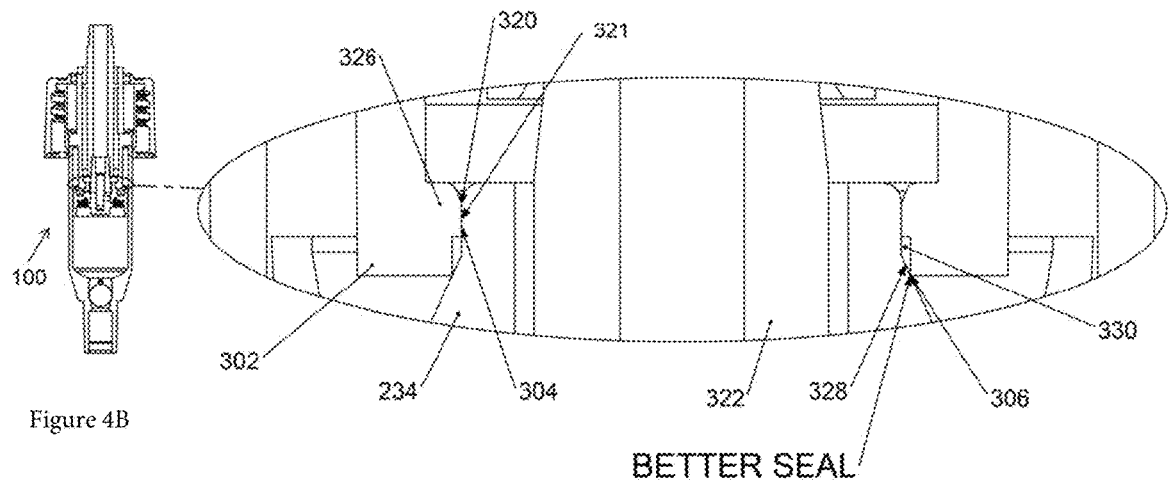
Figure 4B
Figure 4A
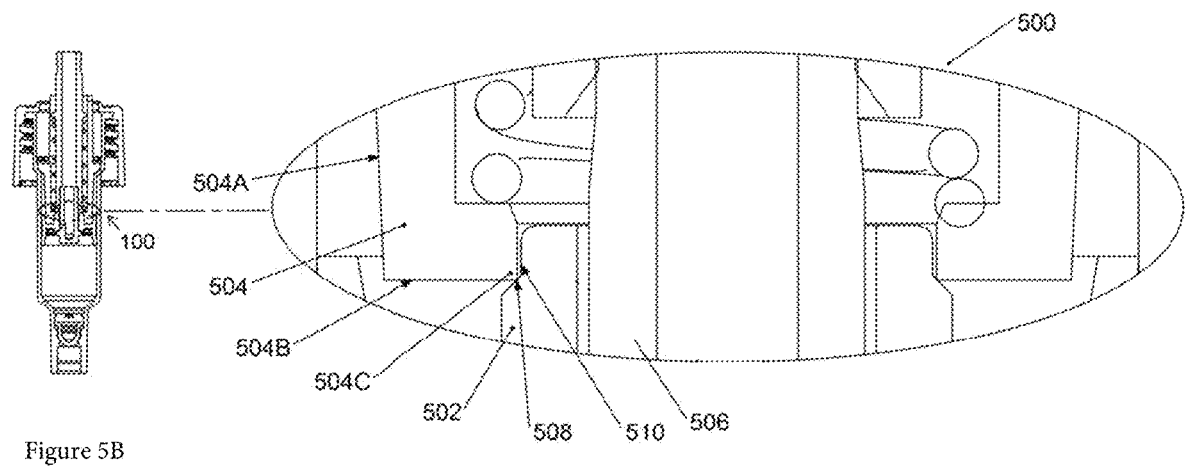
Figure 5B
Figure 5A

FLUID SEAL HAVING MULTIPLE DIAMETERS

FIELD OF THE INVENTION

The invention relates to a fluid seal, manufactured from hard or semi-hard materials, that has multiple diameters to provide an increased seal between elements.

BACKGROUND OF INVENTION

Seals are commonly used to prevent the transfer of fluids from one location to another within an apparatus, such bottles, dispensers, or machines. Common seals are O-rings and flat gaskets which are generally manufactured from a deformable material such as rubber. Applications that require non-deformable material seals however, present a unique problem.

In some applications, such as personal pumps, e.g. atomizers and lotion pumps, it is impractical to add a separate seal, and a plastic to plastic contact is relied upon to create the seal and prevent leakage from one section of the device to another. The molding and machining of these small parts causes restrictions not found in other applications.

A common, prior art method to seal valves involves an edge, or right angle, that contacts an angled surface. The right angle contacts the angled surface at the point where the angled surface starts to open up from a vertical stem. This places two angles in contact with one another, minimizing the surface contact and therefore the seal.

SUMMARY OF THE INVENTION

A seal to prevent fluid transfer using double diameters to provide a tighter seal is disclosed. The double diameter seal has a body with a height, a first diameter containing an upper contact area having a length and a second diameter forming a lower contact point. A notch extends into the body between the upper contact area and the lower contact point for a predetermined distance to form a transition point. The transition point can be a 45 degree, or in some embodiments greater, angle. In use, the first diameter is dimensioned to place a portion of the length of the upper contact area in sliding engagement adjacent to a length of the first surface. The second diameter dimensioned to place the lower contact point contacting an angled second surface of a valve.

The material of manufacture for the seal can be a semi-flexible, semi rigid or rigid material depending on end use and can be used in a number of areas. One such one use is within the piston and coupling area where the upper contact area contacts the valve stem and the lower contact point the angled valve stem expansion leg. Another is wherein the seal is used within the piston and valve area of a pump with the upper area contacting the valve stem outer surface and the lower contact point contacting the valve expansion leg. In both of the foregoing examples the lower contact point is dimensioned to come in contact with the expansion leg at about one third the expansion leg's length.

BRIEF DESCRIPTION OF THE DRAWINGS

These and other objects, features, advantages and aspects of the present invention can be better understood with reference to the following detailed description of the preferred embodiments when read in conjunction with the appended drawing figures.

FIG. 4A is a cutaway side view of prior art pump and fluid seal area;

FIG. 4B is a cutaway exploded side view of prior art fluid seal in the piston and coupling area of the prior art pump of FIG. 4A;

FIG. 5A is a cutaway side view of a pump, identifying the fluid seal area, in accordance with the disclosed invention;

FIG. 5B is an exploded cutaway side view of the disclosed double diameter seal used at the piston and coupling area of the pump of FIG. 5A in accordance with the disclosed invention;

DETAILED DESCRIPTION OF THE INVENTION

Definitions

Figure 1:
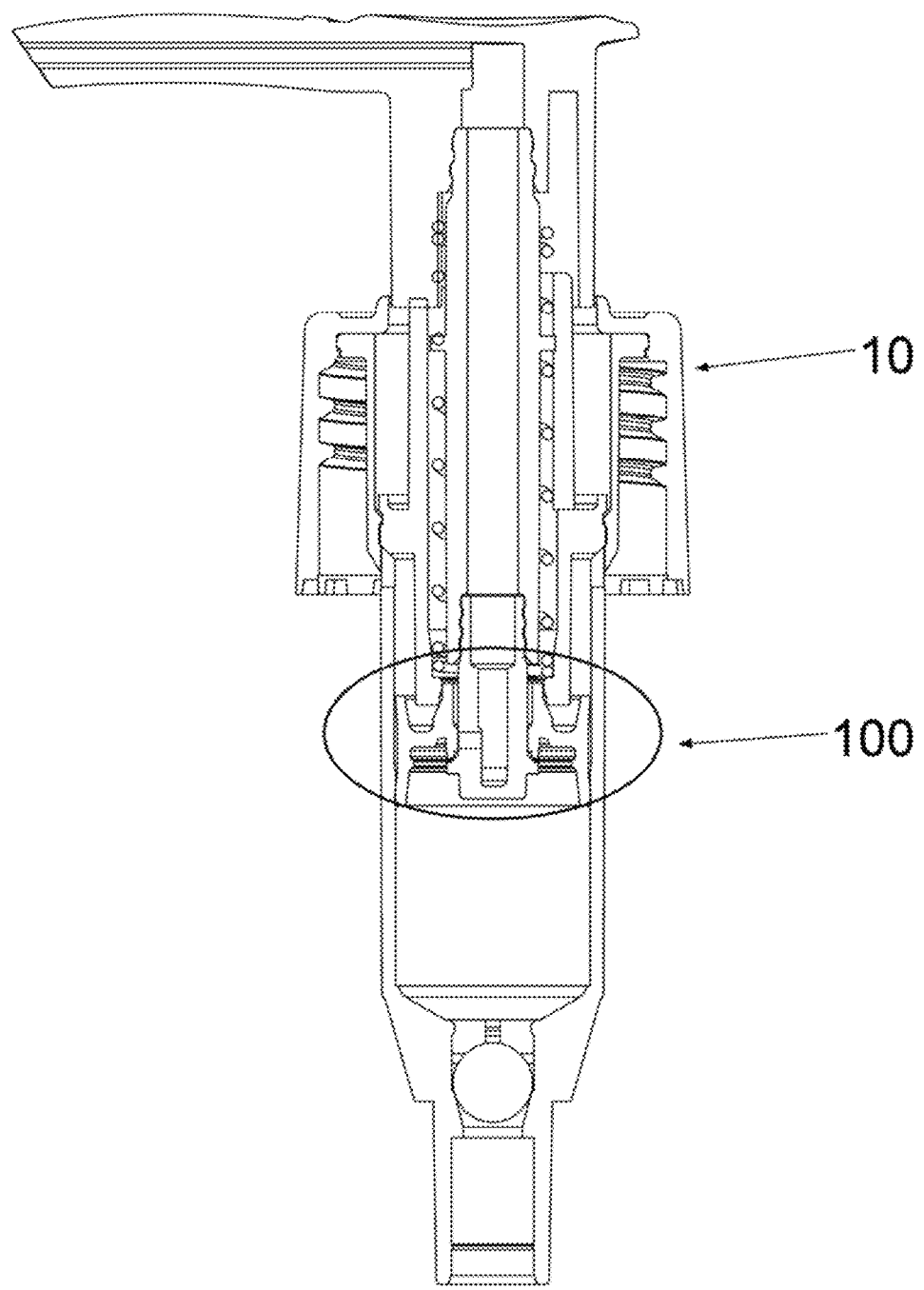
FIG. 1 is a cutaway side view of a pump illustrating example area within which the disclosed double diameter seal is used in accordance with the disclosed invention.

As used herein the terms "about", "substantially", and "approximately" shall mean the numerical value, plus or minus 10%.

As used herein the term "pump" shall refer to any device that dispenses a fluid from a retaining area, including but not limited to hand cream dispensers, perfume atomizers, pressurized dispensing heads such as canned air, etc.

As used herein the term "seal" shall refer to any device that prevents the transfer of fluid from one portion of a container to another.

As used herein the term "fluid" shall refer to any substance, liquid or gas, that is capable of flowing.

As used herein the term "inflection" shall refer to the transition from straight to sloped or angled.

The disclosed seal design, using a multiple diameter seal, provides a tighter seal that is achieved through better alignment of the sealing parts involved. Although the double seal disclosed herein is illustrated in use with an atomizer, the multiple diameter seal can be used in any application, including industrial, where a seal is used to prevent fluid seepage, such as water, oil and chemicals. Some examples of areas of use would be brakes, pressure seal valves, hydraulics, earthmoving machinery and textile machinery.

Due to the use of multiple diameters to create multiple contact points, there is more flexibility as to the material of manufacture. With standard seals the material deformation increases the area of contact. In the disclosed seal, the materials of manufacture can have less deformation due to the multiple points of contact and the ability to eliminate the gap required in prior art seals (FIGS. 2A, 2B and 4A, 4B).

The flexibility in material used for the disclosed seal can be varied, semi-flexible, semi-rigid and rigid, and can include metals and composites. The use of harder materials eliminates soft wearable seals, making valves more durable and inexpensive. It will be obvious to those skilled in the arts to select the material best applicable to the end use.

The disclosed tighter seal allows less force to be applied for shaft depression in order for the sealing elements to achieve closure. The disclosed design, when used with atomizers or other personal use pumps, results in a pump suitable for people that may not be able to exert sufficient pressure to actuate stiffer pumps and improves the user experience in general. To create a tight seal, the stem of the pump of the present invention is close to the enclosing ring containing the seal, located at the point where the vertical stem travels to open and close the valve. Further, the right angle of the seal hits the sloped surface of the stem slightly lower than where the angle of the stem starts to allow a good homogeneous seal. As the elements are frequently manufactured from plastic and since plastic and machine surfaces can have a small radius of transition, dropping the point of initial contact ensures that a good seal will be obtained. More importantly this positioning maintains the stem in sliding engagement with the ring completely straight, allowing the force exerted for closure of the valve to be used as efficiently as possible.

To achieve the desired contact a double diameter seal is used, with the upper diameter parallel to the stem and positioned as closely as possible while enabling movability. The second diameter of the double diameter seal forms a right angle that hits the sloped surface a bit lower, providing a better, more even seat and a more efficient seal.

Figures 2A, 2B:
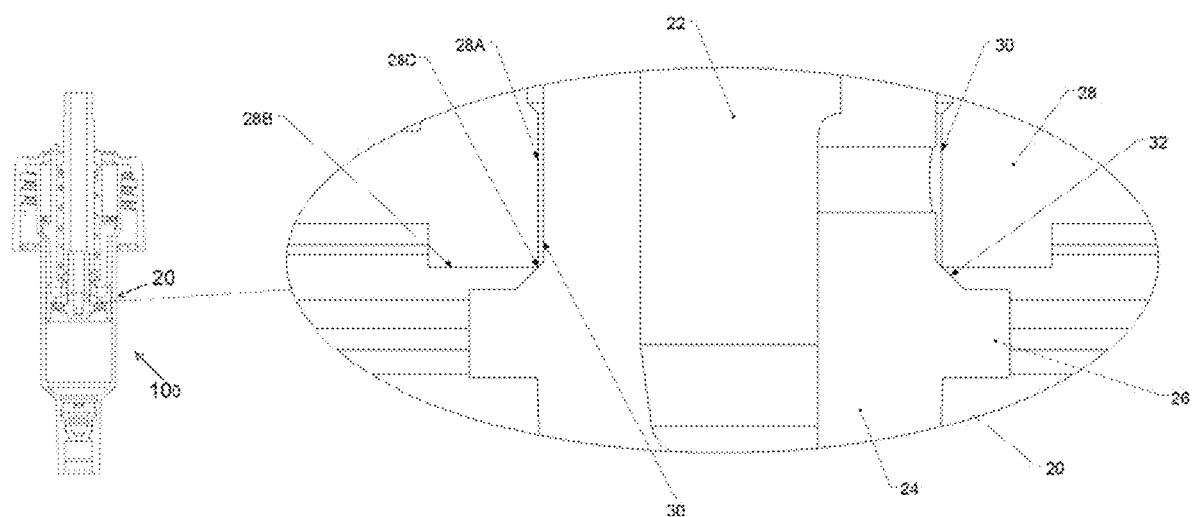
FIG. 2A is a cutaway side view of prior art pump.
FIG. 2B is a cutaway exploded view of fluid seal in the piston and stem area in the prior art pump illustrated in FIG. 2A.

FIG. 1 illustrates the interior of a pump 10 with the portion of the pump 10 being addressed in FIGS. 2A and B-3A and B identified as seal section 100 and as 200 in FIGS. 4A and B and 5A and B. The sealed section 100/200 of the pump prevents external air from entering the cylinder as well as the contents from leaking into the fluid chamber.

In FIGS. 2A and 2B the seal area 20 of a prior art design is illustrated. In this design the stem 24 has a flange 26 that is connected on one side to the stem 24 by an angled valve expansion leg 32. It is the angled valve expansion leg 32 that provides the seat for the seal 28. As can be seen in this figure the seal 28 is basically a straight length 28A, less any notches required for other elements, with the base 28B at right angles, leaving only the vertex 28C of the seal 28 to contact the angled valve expansion leg 32. As seen in the prior art design, an undesirable gap 30 needs to be left to allow the corner 28c to seal against the angled surface 32. This gap 30 can cause the seal to be uneven. As stated herein the accuracy of the molding is not perfect and a thousandth of an inch or two off, or a small inclination of the stem, will weaken the seal, permitting leakage.

Figures 3A, 3B:
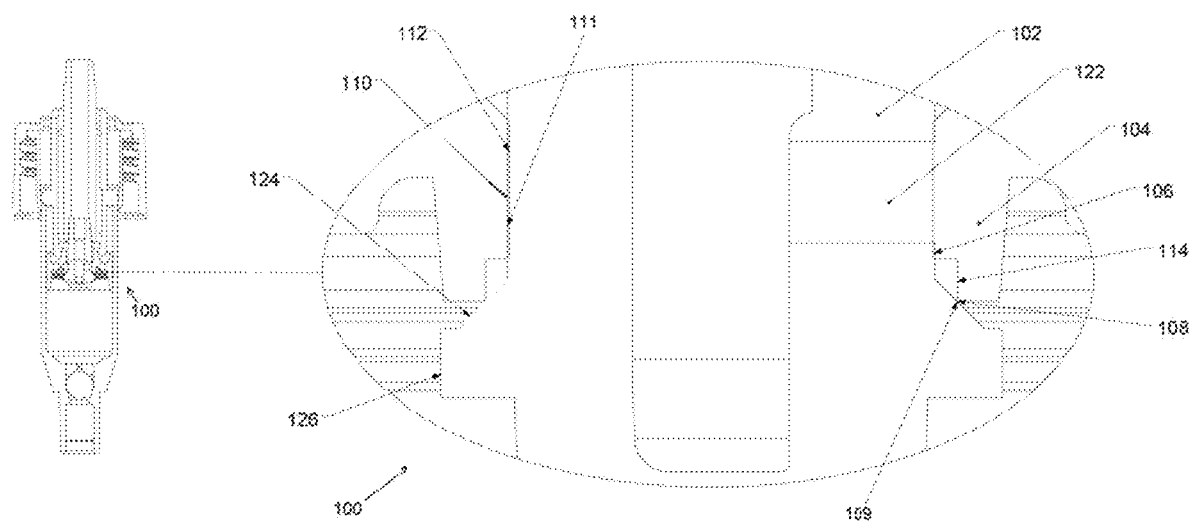
FIG. 3A is a cutaway side view of a pump in accordance with the disclosed invention.
FIG. 3B is an exploded cutaway side view of the disclosed double diameter seal used at the piston and stem area of the pump of FIG. 3A in accordance with the disclosed invention.

In FIGS. 3A and 3B the seal section 100 illustrates in detail the disclosed double diameter seal 104 replacing the prior art seal of FIGS. 2A and 2B in the piston and valve area of the pump. The contacting face 110 of the seal 104 is parallel, adjacent to, and in sliding engagement with the valve stem outer surface 112, providing guidance and support to the stem 102 during movement. As can be seen from the exploded cutaway of FIG. 3A, at contact area 111 the disclosed design eliminates a gap between the contacting face 110 and stem outer surface 112. At the distal end of the seal 104, a notch 114 is forms the upper contact area 106 and lower contact point 108. The upper contact area 106 contacts the stem 102 along a portion of its length prior to the angled valve expansion leg 124. The lower contact point 108 contacts the angled valve expansion leg 124 approximately one third along the length of the expansion leg 124. The angled valve expansion leg 124 leads from the stem 102 body to the valve 126 that serves to allow or cut off flow of the fluid being dispensed at contact point 109.

In FIGS. 4A and 4B a prior art design 500 is illustrated in the piston and coupling area, wherein the seal 504 is adjacent the valve 502 which is, in turn, adjacent the piston 506. As described heretofore, the prior art seal 504 has a single diameter design, side 504A and base 504B, with the vertex 504C contacting the angled valve extension 508. This design uses one point of contact with only one straight angle leaving an undesirable gap 510, and allowing movement that makes the seal less efficient, requiring more force to be applied for the seal to work properly.

In FIGS. 5A and 5B the double diameter seal 302 is used in the piston and coupling area 200 of FIG. 5B, within the pump 10, replacing the seal of FIGS. 4A and 4B, and illustrating the versatility of the double diameter seal design. In this embodiment the upper contact area 304 on the seal 302 is used as the initial point of contact to stabilize the valve stem 322 through contact with the outer diameter 320 of the valve 324. As illustrated, the contact 321 between the seal 302 and the valve 324 outer diameter 320 eliminates the gap required by the prior art design and provides additional stability. The lower point of contact 306 of the seal 302 contacts the angled valve stem expansion leg 328 to provide a firm, efficient and stable seal.

In this illustration the top contact portion 326 of the seal 302 is more curved than in FIGS. 3A and 3B to illustrate the design variation possible for assembly or other purposes. Additionally, the notch 330 of the seal 302 has different proportions and/or dimensions than the notch 114 to accommodate contact with additional elements. The dimensions and proportions will differ depending upon end use, however the critical feature of dual diameters producing separate seating locations remains critical. As does the lower contact point seating on the angled valve expansion leg.

Figure 6:
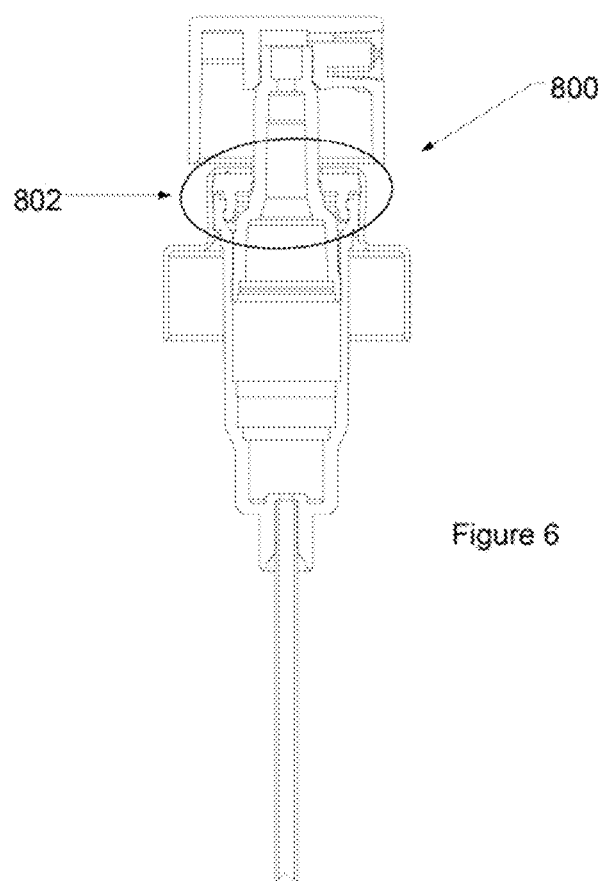
FIG. 6 is a cutaway back view of a pump illustrating another example area within which the disclosed double diameter seal is used in accordance with the disclosed invention.
Figure 8:
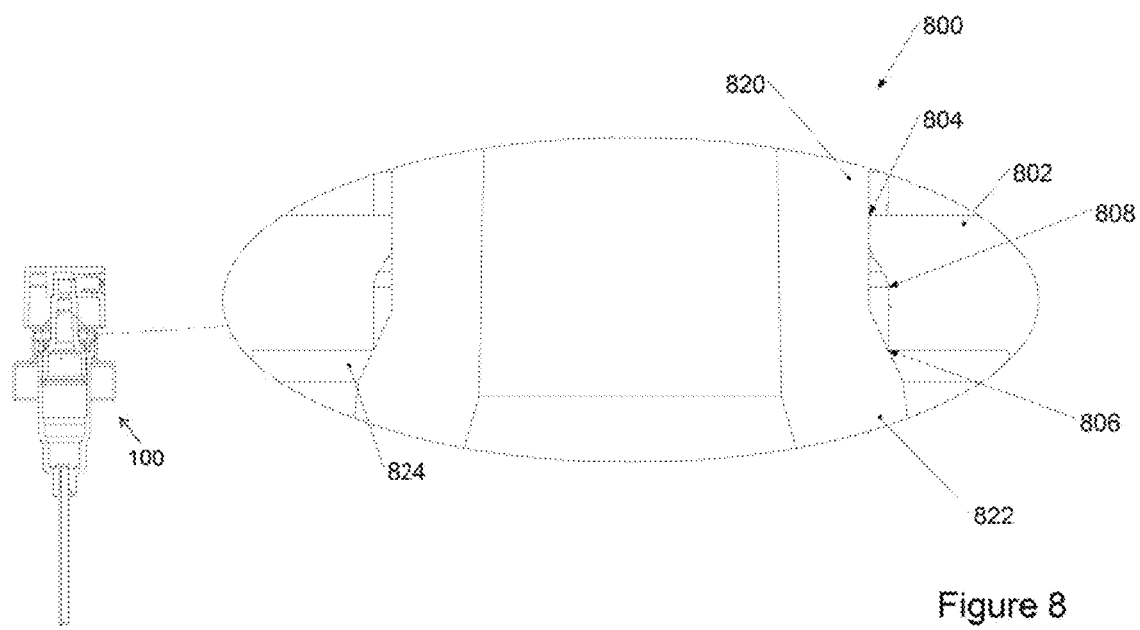
FIG. 8 is an exploded side view of the disclosed double diameter seal used at the upper area of the pump identified in FIG. 6 in accordance with the disclosed invention.

In FIG. 6 the disclosed double diameter seal is illustrated used in an alternate location in example pump 800 with the seal area 802 illustrated in detail in FIG. 8.

Figure 7:
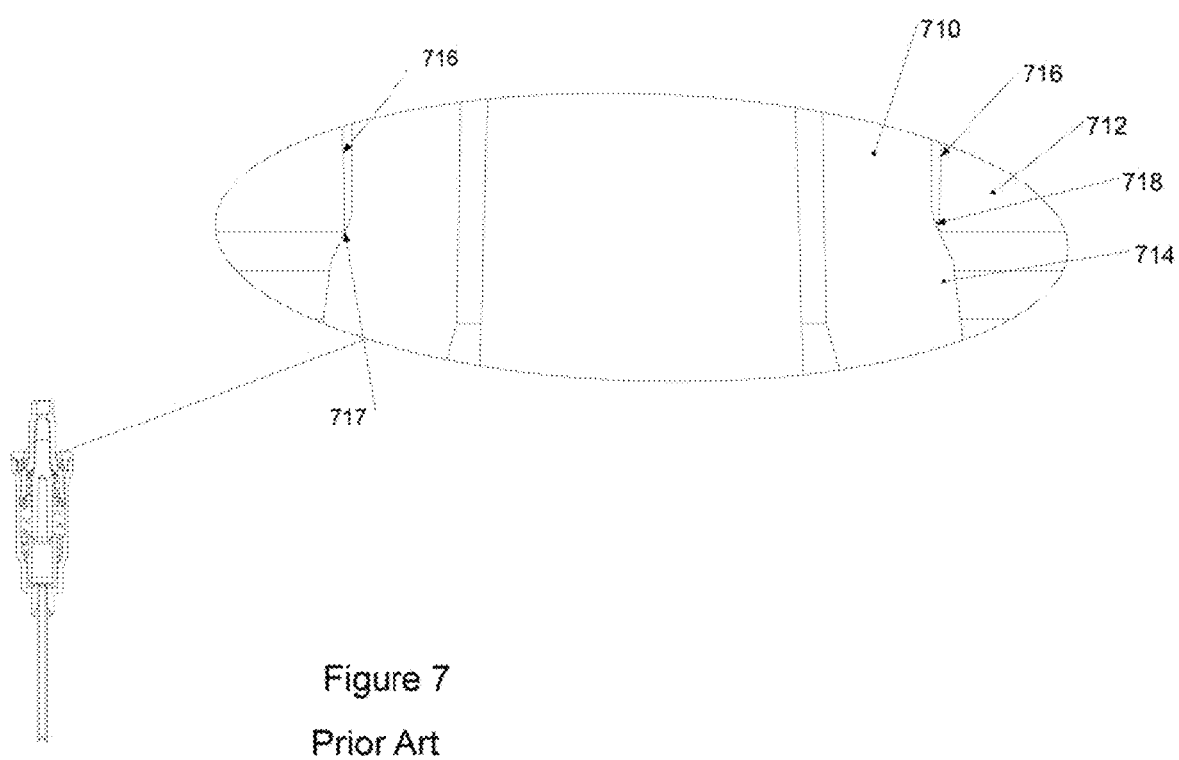
FIG. 7 is a cutaway side view of prior art pump with the fluid seal in the upper area of the pump.

In FIG. 7 a prior art design is used, in the location illustrated in FIG. 6, to seal the stem 710 with the gap 716 between the stem 710 and the seal 712 clearly illustrated. In order for the straight seal 712 to contact the angled valve expansion leg 714 it must be spaced a slight distance from the stem 710, creating the gap 716 and only a single seal point 718. Due to molding and machining restrictions normally case a radius to be formed as shown at 717.

In FIG. 8 the double diameter seal 802 is illustrated replacing the prior art seal design of FIG. 7, illustrating the additional versatility of the double diameter seal design. Due to the location of the double diameter seal 802, the height of the seal 802 has been dimensioned to fit within the example pump. The upper contact point 804 is adjacent to the outer diameter 820 of the stem 822 to stabilize the stem 822 as well as provide the initial point of contact, or seal. The lower point of contact 806 contacts the valve expansion leg 824, approximately one third from the point of inflection, to provide the second seal. In this illustration the notch 808 is more curved than in FIG. 3 to illustrate the design variation possible.

In all embodiments the lower contact point should contact the angled valve expansion leg about a third of the way from the inflection along the angled valve expansion leg's length, to allow for a good seat. Although the exact distance can vary with size and application, the lower contact point needs to stay away from the inflection areas of the slope, where the angled slope begins. As will be known to those skilled in the art the height and width of the seal is dependent upon the end use, as is the material of manufacture.

It should be noted that the length and width of the double diameter seal body and legs, material of manufacture, and configuration of the notch can be adjusted dependent upon the size of the pump or item being sealed. The critical feature is the double diameter, providing properly positioned double contact points. The upper, or first, contact point must be prior to the start of the angle extension leg while the second point of contact must be on the angle extension leg. This distance is preferably about one third the length of the leg.

The examples heretofore have been for small pumps manufactured from a hard or semi-hard material where the addition of a moldable soft seal part is impractical. There are other applications where the elimination of a moldable seal is advantageous, such as in caustic environments. Although there are seals that can be used in caustic environments, they are costly and require monitoring and replacement. Seal-less pumps are available; however they are expensive. Additional uses will be found in the automotive industry, chemical industry, and generally any industry that uses valves where it would be beneficial to avoid soft seals. Although rubber, silicone, and other soft material seals, may be inexpensive, the cost in time and possible machine failure upon seal failure, makes them more expensive than the manufacturing cost.

Broad Scope of the Invention

The use of the terms "a" and "an" and "the" and similar references in the context of this disclosure (especially in the context of the following claims) are to be construed to cover both the singular and the plural, unless otherwise indicated herein or clearly contradicted by context. AH methods described herein can be performed in any suitable order unless otherwise indicated herein or otherwise clearly contradicted by context. The use of any and all examples, or exemplary language (e.g., such as, preferred, preferably) provided herein, is intended merely to further illustrate the content of the disclosure and does not pose a limitation on the scope of the claims. No language in the specification should be construed as indicating any non-claimed element as essential to the practice of the present disclosure.

Multiple embodiments are described herein, including the best mode known to the inventors for practicing the claimed invention. Of these, variations of the disclosed embodiments will become apparent to those of ordinary skill in the art upon reading the foregoing disclosure. The inventors expect skilled artisans to employ such variations as appropriate (e.g., altering or combining features or embodiments), and the inventors intend for the invention to be practiced otherwise than as specifically described herein.

Accordingly, this invention includes all modifications and equivalents of the subject matter recited in the claims appended hereto as permitted by applicable law. Moreover, any combination of the above described elements in all possible variations thereof is encompassed by the invention unless otherwise indicated herein or otherwise clearly contradicted by context.

The use of individual numerical values are stated as approximations as though the values were preceded by the word "about", "substantially", or "approximately." Similarly, the numerical values in the various ranges specified in this application, unless expressly indicated otherwise, are stated as approximations as though the minimum and maximum values within the stated ranges were both preceded by the word "about", "substantially", or "approximately." In this manner, variations above and below the stated ranges can be used to achieve substantially the same results as values within the ranges. As used herein, the terms "about", "substantially", and "approximately" when referring to a numerical value shall have their plain and ordinary meanings to a person of ordinary skill in the art to which the disclosed subject matter is most closely related or the art relevant to the range or element at issue. The amount of broadening from the strict numerical boundary depends upon many factors. For example, some of the factors which may be considered include the criticality of the element and/or the effect a given amount of variation will have on the performance of the claimed subject matter, as well as other considerations known to those of skill in the art. As used herein, the use of differing amounts of significant digits for different numerical values is not meant to limit how the use of the words "about", "substantially", or "approximately" will serve to broaden a particular numerical value or range. Thus, as a general matter, "about", "substantially", or "approximately" broaden the numerical value. Also, the disclosure of ranges is intended as a continuous range including every value between the minimum and maximum values plus the broadening of the range afforded by the use of the term "about", "substantially", or "approximately". Thus, recitation of ranges of values herein are merely intended to serve as a shorthand method of referring individually to each separate value falling within the range, unless otherwise indicated herein, and each separate value is incorporated into the specification as if it were individually recited herein. To the extent that determining a given amount of variation of some the factors such as the criticality of the slit patterns, paper width differential pre- and post-expansion, paper weights and type, as well as other considerations known to those of skill in the art to which the disclosed subject matter is most closely related or the art relevant to the range or element at issue will have on the performance of the claimed subject matter, is not considered to be within the ability of one of ordinary skill in the art, or is not explicitly stated in the claims, then the terms "about", "substantially", and "approximately" should be understood to mean the numerical value, plus or minus 10%.

It is to be understood that any ranges, ratios and ranges of ratios that can be formed by, or derived from, any of the data disclosed herein represent further embodiments of the present disclosure and are included as part of the disclosure as though they were explicitly set forth. This includes ranges that can be formed that do or do not include a finite upper and/or lower boundary. Accordingly, a person of ordinary skill in the art most closely related to a particular range, ratio or range of ratios will appreciate that such values are unambiguously derivable from the data presented herein.

What is claimed is:

1. A seal having two areas of contact to prevent fluid transfer comprising: a. a body comprising:
   1. a height;
   2. a first diameter containing a first contact area having a length in unbroken contact with a valve stem within a piston and coupling area, said first contact area providing stability during movement of said valve stem; and
   3. a second diameter containing a second contact area at a distal end of the second diameter, the second contact area contacting a valve stem expansion leg within a piston and coupling area that extends at an angle from said valve stem, said second contact area providing a firm, stable seal upon contact with said valve stem expansion leg; and b. a notch extending into said body between said first contact area and said second contact area at a predetermined distance to form a transition point between said first diameter and said second diameter, wherein second diameter is less than said first diameter; wherein said first diameter is dimensioned to place said first contact area in sliding engagement with, and adjacent to, a length of said valve stem, and said second diameter is dimensioned to place said second contact area adjacent said valve stem expansion leg to form a seal.

2. The seal of claim 1 wherein said second diameter contacts said valve expansion leg at a point about one third the length of said valve expansion leg.

3. The seal of claim 1 wherein said length of said valve stem and said length of said first contact area are adjacent to one another for at least a portion of a total length of said length of said valve stem.

4. The seal of claim 1 wherein said seal is a semi-flexible material.

5. The seal of claim 1 wherein said seal is a semi-rigid material.

6. The seal of claim 1 wherein said seal is a rigid material.

7. The seal of claim 1 wherein said transition point forms a right angle between said first diameter and said second diameter.

8. The seal of claim 1 wherein said transition point forms a greater than 45-degree angle between said first diameter and said second diameter.

9. The seal of claim 1 wherein said valve stem and said valve expansion leg are within a piston and valve area of a pump.

10. The seal of claim 9 wherein said second diameter contacts said valve expansion leg at a point about one third the length of said valve expansion leg.

11. A seal having multiple areas of contact to prevent fluid transfer comprising:
   a. a body comprising:
      1. a height;
      2. a first diameter containing a first contact area having a length in unbroken contact with a valve stem along said length; and
      3. a second diameter containing a second contact area at a distal end of the second diameter, the second contact area contacting a valve stem expansion leg extending at an angle from said valve stem, said second contact area providing a firm, stable seal upon contact with said valve stem expansion leg, said valve stem expansion leg having a length; and
   b. A notch extending into said body at a predetermined distance to form a transition point from said first diameter to said second diameter, wherein said second diameter is less than said first diameter;
   wherein said first diameter is dimensioned to place said length of said first contact area in sliding engagement with, and adjacent to, a length of said valve stem to provide stability, and said second diameter is dimensioned to place said second contact area adjacent to said valve stem expansion leg, said valve stem expansion leg being at an angle to said valve stem, and said second point contacting said valve stem expansion leg at a point about one third the length of said valve stem expansion leg to provide a firm seal.

12. The seal of claim 11 wherein said seal is a semi-flexible material.

13. The seal of claim 11 wherein said seal is a semi-rigid material.

14. The seal of claim 11 wherein said seal is a rigid material.

15. The seal of claim 11 wherein said transition point forms a right angle between said first diameter and said second diameter.

16. The seal of claim 11 wherein said transition point forms a greater than 45-degree angle between said first diameter and said second diameter.

17. The seal of claim 11 wherein said valve stem and said valve expansion leg are within a piston and valve area of a pump.

* * * * *